United States Patent
M L et al.

(10) Patent No.: US 12,242,932 B2
(45) Date of Patent: Mar. 4, 2025

(54) EXECUTION OF MACHINE LEARNING MODELS AT CLIENT DEVICES

(71) Applicant: PayPal, Inc., San Jose, CA (US)

(72) Inventors: Nishanth M L, Madhugiri (IN); Chandan C G, Bengaluru (IN)

(73) Assignee: PayPal, Inc., San Jose, CA (US)

( * ) Notice: Subject to any disclaimer, the term of this patent is extended or adjusted under 35 U.S.C. 154(b) by 871 days.

(21) Appl. No.: 17/402,709

(22) Filed: Aug. 16, 2021

(65) Prior Publication Data

US 2022/0414536 A1 Dec. 29, 2022

(30) Foreign Application Priority Data

Jun. 29, 2021 (IN) .............................. 202141029162

(51) Int. Cl.
*G06N 20/00* (2019.01)
*G06F 18/214* (2023.01)
*G06F 21/60* (2013.01)
*H04L 9/14* (2006.01)

(52) U.S. Cl.
CPC ............ *G06N 20/00* (2019.01); *G06F 18/214* (2023.01); *G06F 21/602* (2013.01); *H04L 9/14* (2013.01)

(58) Field of Classification Search
CPC ...................................................... G06N 20/00
USPC ........................................................... 706/12
See application file for complete search history.

(56) References Cited

U.S. PATENT DOCUMENTS

| | | |
|---|---|---|
| 2020/0104636 A1 | 4/2020 | Halevi et al. |
| 2020/0320349 A1 | 10/2020 | Yu et al. |
| 2020/0327222 A1 | 10/2020 | Chhabra et al. |
| 2021/0056540 A1 | 2/2021 | McCauley et al. |

OTHER PUBLICATIONS

Al-Rubaie M., et al., "Privacy Preserving Machine Learning: Threats and Solutions," IEEE Security and Privacy, vol. 17, No. 02, Retrieved from Internet URL: https://arxiv.org/ftp/arxiv/papers/1804/1804.11238.pdf, Retrieved on Mar. 29, 2019, 18 pages.
Homomorphic encryption; Wikipedia; https://en.wikipedia.org/w/index.php?title=Homomoprhic_encryption&oldid=1015416852; this page was last edited on Apr. 1, 2021; 12 pages.

(Continued)

*Primary Examiner* — Austin Hicks
(74) *Attorney, Agent, or Firm* — Kowert, Hood, Munyon, Rankin & Goetzel, P.C.

(57) ABSTRACT

Techniques are disclosed relating to the execution of machine learning models on client devices, particularly in the context of transaction risk evaluation. This reduces computational burden on server systems. In various embodiments, a server system may receive, from a client device, a request to perform a first operation and select a first machine learning model, from a set of machine learning models, to send to the client device. In some embodiments the first machine learning model is executable, by the client device, to generate model output data for the first operation based on one or more encrypted input data values that are encrypted with a cryptographic key inaccessible to the client device. The server system may send the first machine learning model to the client device and then receive, from the client device, a response message that indicates whether the first operation is authorized based on the model output data.

20 Claims, 7 Drawing Sheets

(56) References Cited

OTHER PUBLICATIONS

GitHub—microsoft/onnxjs: ONNX.js: run ONNX models using JavaScript; https://github.com/Microsoft/onnxjs; retrieved Jun. 18, 2021; 6 pages.
Process input and output data with the TensorFlow Lite Support Library, Creative Commons Attribution 4.0 License; last updated May 16, 2021 UTC, 7 pages.
Secure multi-party computation; Wikipedia; https://en.wikipedia.org/w/index.php?title=Secure_multi-party_computation&oldid=1029193891; this page was last edited on Jun. 18, 2021; 11 pages.
TensorFlow Lite converter, Creative Commons Attribution 4.0 License; last updated Jan. 28, 2021 UTC, 8 pages.
International Search Report and Written Opinion in PCT Appl. No. PCT/US2022/073076 mailed Sep. 21, 2022, 14 pages.
International Preliminary Report on Patentability for Application No. PCT/US2022/073076 mailed on Jan. 11, 2024, 7 pages.

_500_

```
Receive, from a client device, a request to perform a first operation via a service provided by a
server system
502
```

```
Determine that the first operation is associated with at least one of a plurality of machine learning
models that are executable at the client device to determine whether to authorize the first
operation
504
```

```
Select a first one of the plurality of machine learning models to send to the client device, where
the first machine learning model is executable, by the client device, to generate model output data
for the first operation based on one or more encrypted input data values that are encrypted with a
cryptographic key inaccessible to the client device, where the model output data corresponds to a
level of risk associated with performing the first operation
506
```

```
Send machine learning model evaluation data to the client device, where the machine learning
model evaluation data includes the first machine learning model and the one or more encrypted
input data values
508
```

```
Receive, from the client device, a response message that indicates whether the first operation is
authorized based on the model output data
510
```

```
┌─────────────────────────────────────────────────────────────────┐
│ Access training data that includes training samples             │
│ corresponding to prior operations performed, via a service      │
│ provided via a server system, for a plurality of users          │
│                              602                                │
└─────────────────────────────────────────────────────────────────┘
                               ↓
┌─────────────────────────────────────────────────────────────────┐
│ Generate encrypted training data that includes encrypted        │
│ training samples corresponding to the training samples, where   │
│ a particular one of the encrypted training samples includes a   │
│ plurality of encrypted data values corresponding to a           │
│ particular one of the prior operations                          │
│                              604                                │
└─────────────────────────────────────────────────────────────────┘
                               ↓
┌─────────────────────────────────────────────────────────────────┐
│ Train a first machine learning model based on the encrypted     │
│ training data such that, after training, the first machine      │
│ learning model is operable to generate, based on encrypted      │
│ input data, model output data corresponding to a level of risk  │
│ associated with a particular type of operation                  │
│                              606                                │
└─────────────────────────────────────────────────────────────────┘
                               ↓
┌─────────────────────────────────────────────────────────────────┐
│ Convert the first machine learning model into a format that is  │
│ executable by client devices to generate the model output data  │
│                              608                                │
└─────────────────────────────────────────────────────────────────┘
                               ↓
┌─────────────────────────────────────────────────────────────────┐
│ Receive, from a first client device, a request to perform a     │
│ first operation, of the particular type of operation, via the   │
│ service provided via the server system                          │
│                              610                                │
└─────────────────────────────────────────────────────────────────┘
                               ↓
┌─────────────────────────────────────────────────────────────────┐
│ Send the first machine learning model to the first client device│
│                              612                                │
└─────────────────────────────────────────────────────────────────┘
```

*FIG. 6*

EXECUTION OF MACHINE LEARNING MODELS AT CLIENT DEVICES

RELATED APPLICATIONS

The present application claims priority under 35 U.S.C. § 119 to Indian patent application 202141029162, filed Jun. 29, 2021, the disclosure of which is incorporated by reference herein in its entirety.

BACKGROUND

Technical Field

This disclosure relates generally to machine learning and computer system security, and more particularly to the execution of machine learning models at client devices.

Description of the Related Art

A server system may provide various services (e.g., as part of one or more web services) to remote end users. In providing these various services, a server system may utilize machine learning models to improve various aspects of these services and/or the security of the server system itself. As a non-limiting example, in some instances a server system may train machine learning models for use in identifying malicious activity by users of the server system. Such malicious activity may be intended to disrupt server operations, use server resources unnecessarily, and/or compromise server computer security. When the server system receives a request to perform an operation via a service it provides, the server system may utilize one or more of the machine learning models to determine whether to authorize the requested operation. Utilizing machine learning models on the server system may present various technical challenges, however. For example, running these machine learning models may present a significant computational burden for the server system, particularly when the server system runs a large number (e.g., hundreds of thousands, millions, etc.) of machine learning models per day, or handles large numbers of user requests.

BRIEF DESCRIPTION OF THE DRAWINGS

FIGS. 5 and 6 are flow diagrams illustrating example methods for executing one or more machine learning models on a client device, according to some embodiments.

DETAILED DESCRIPTION

Figure 1:
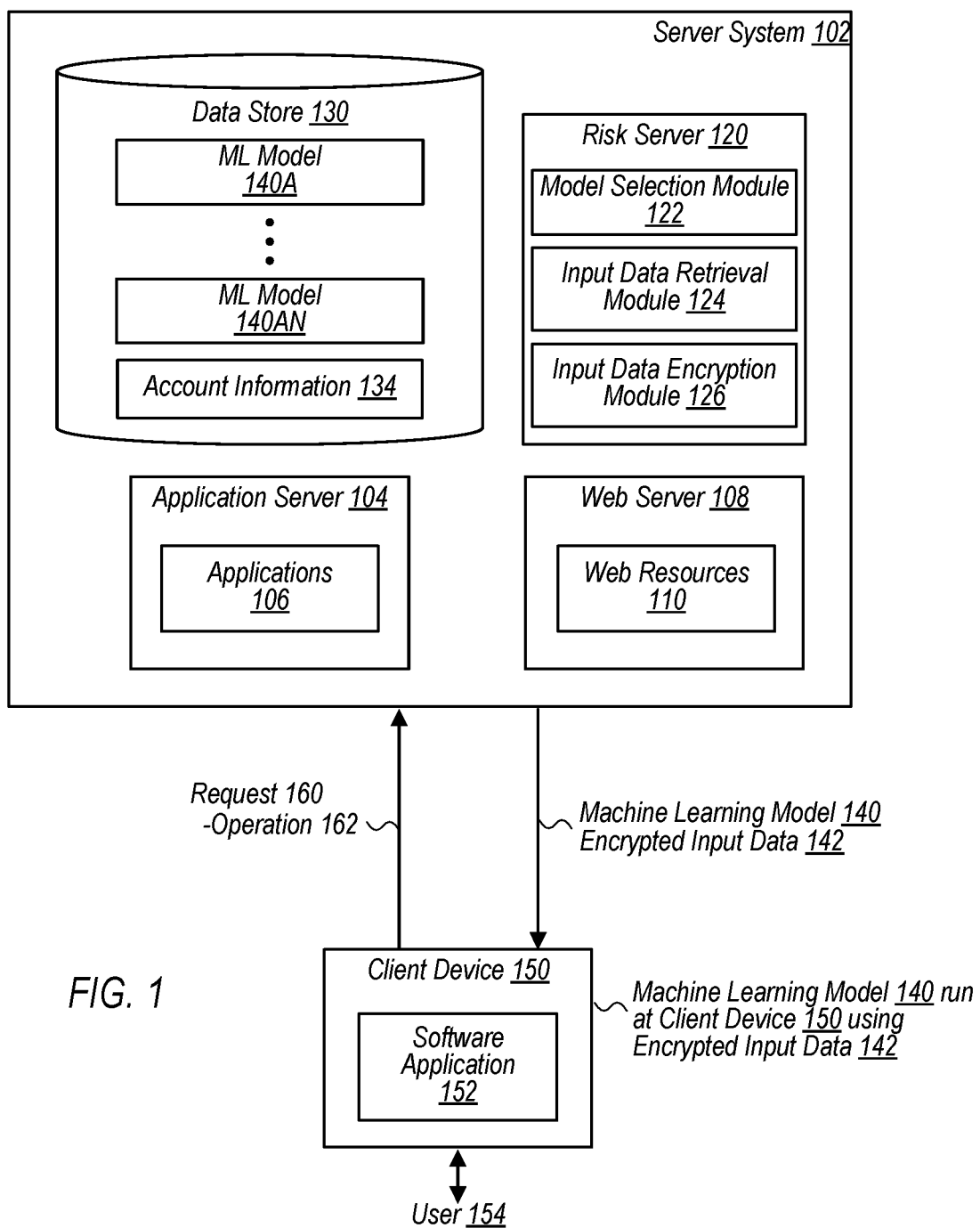
FIG. 1 is a block diagram illustrating an example system in which one or more machine learning models may be executed on a client device, according to some embodiments.

In many instances, a server system may use machine learning models to assess the risk associated with, and determine whether to authorize, an operation requested by a user of the server system. For example, after it receives a request from a user to perform an operation via a service it provides, the server system may run one or more machine learning models to generate model output data that corresponds to a level of risk associated with the server system performing the requested operation. Based on this model output data, the server system may determine whether to authorize the requested operation.

Running these machine learning models may present a significant computational burden for the server system, however, particularly in larger server systems comprising multiple machines that may be serving tens or hundreds of thousands of requests per hour. For example, some of these risk models are computationally intensive and require significant computing resources to execute. Further, even in instances in which an individual risk model is not computationally expensive to run, the cumulative effect of running the model to evaluate many different user requests can still present a significant computational burden.

Consider, as a non-limiting example, a scenario in which a server system utilizes a two-tiered model framework having a first tier that uses relatively less computationally intensive machine learning models (that is, "lightweight" models) and a second tier that uses relatively more computationally intensive machine learning models (that is, "heavy" models). In this scenario, the lightweight models may use less data and/or run faster than the heavy models, which are more resource intensive but may provide better predictive capabilities. In many instances, the lightweight models may be sufficient to determine whether to authorize a requested transaction, such as an electronic purchase transaction. As one non-limiting example, the output of a lightweight model may indicate that, within some margin of error, a requested operation has a particular percentage chance of being malicious. In some instances, the server system may first use a lightweight risk model to evaluate a requested transaction and resort to a heavier model only if the lightweight model indicates that the transaction has some reasonable chance of being malicious (e.g. if the lightweight model indicates the transaction is very likely legitimate, there may be no need to invoke a heavier machine learning model). In instances in which the server system receives a large number (e.g., millions) of requests per day, the execution of these lightweight models may account for a high amount of traffic on the server system's risk servers. Accordingly, even though they are less resource intensive than the heavier models, the lightweight models may still present a significant computational burden for the server system, such as 20%, 40%, 50+%, or some other percentage of the total computational burden for executing these models on the server system. Additionally, running these models at the server side may contribute to time delays for the user while the server system determines whether to authorize a request.

In various embodiments, however, the disclosed techniques solve these or other technical problems by executing machine learning models on client devices. That is, this disclosure describes techniques in which one or more machine learning models (e.g., lightweight risk evaluation models) are executed by the client device, rather than the server system, to determine whether to authorize an operation requested by a user of the client device.

For example, when the server system receives a request to perform an operation (e.g., a request to log into a user account), the server system may determine whether that operation is one that is associated with a machine learning model that is executable, at the client device, to determine whether to authorize the requested operation. If so, the server system may send the machine learning model to the client device for execution. As described in detail below, in various embodiments these machine learning models are executable, by the client device, to generate model output data that indicates a level of risk associated with performing the requested operation. Further, in various embodiments, the machine learning models are executable to generate this model output data based on encrypted input data that has been encrypted with a cryptographic key that is not accessible to the client devices. Accordingly, in various embodiments, when the machine learning models are run at the client device, a plaintext version of the input to the model is not exposed to potentially malicious users. In addition to the machine learning model, the server system may also send one or more encrypted input data values to the client device. Using these encrypted input data values, the client device may run the machine learning model (e.g., in a browser on the client device) to generate the model output data. The determination of whether to authorize the requested operation may then be performed based on this model output data.

The disclosed techniques provide various technical benefits, according to various embodiments. For example, by running the machine learning models at the client device, the server system is able to save the computational resources that would otherwise be dedicated to this process. When viewed in the context of a high-scale server system that services a large number (e.g., millions) of requests per day, the computational resources saved, by the server system, by running the machine learning models at the client device are significant, while presenting little or negligible additional computational burden to the client device. The server system's reclaimed computational resources can then be used for other purposes that improve the user experience and the operation of the server system as a whole, such as running more computationally intensive machine learning models to evaluate operations that have been identified as potentially high-risk. Further, in various embodiments, running machine learning models at the client device may also improve the user experience by reducing delay, to the user, that would otherwise result as the server system runs the machine learning models on its systems and returns the authorization result to the user. Instead, by providing the machine learning model and encrypted input data to the client device for local execution, the disclosed techniques may reduce or eliminate this delay, improving the user experience with the server system.

Referring now to FIG. 1, block diagram 100 depicts a server system 102 that includes application server 104 hosting one or more software applications 106, web server 108 hosting one or more web resources 110, risk server 120, and data store 130. In various embodiments, risk server 120 is operable to retrieve the appropriate machine learning model 140, usable to determine whether to authorize a requested operation, from data store 130 and send the machine learning model 140 for execution at a client device. For example, in various embodiments, server system 102 may provide one or more computing resources (e.g., as part of a web service) that may be used directly by end users or that may be integrated with (or otherwise used by) web services provided by third parties. As one non-limiting example, server system 102, in some embodiments, provides an online payment service that may be used by end users to perform online financial transactions (e.g., sending or receiving funds) or utilized by merchants to receive funds from users during financial transactions. Note, however, that this embodiment is described merely as one non-limiting example. In other embodiments, server system 102 may provide any of various suitable web services to end users, such as an email service, a streaming media service, an online retail store, etc. Additionally note that, in some embodiments, a "server system" (such as server system 102, application server 104, web server 108, or risk server 120) may be implemented using a single machine. In other embodiments, however, a "server system" may be implemented using multiple machines executing (e.g., at one or more datacenters) for the benefit of a single entity. For example, in some embodiments, one or more of server system 102, application server 104, web server 108, or risk server 120 may be implemented using multiple machines located at one or more datacenters.

FIG. 1 further includes client device 150 operated by user 154. Client device 150 may be any of various suitable computing devices, such as a smartphone, laptop computer, desktop computer, tablet computer, etc. that user 154 may use to access the service(s) provided via server system 102. For example, in various embodiments, client device 150 executes a software application 152, such as a web browser or dedicated software application, usable to access one or more computing resources provided by application server 104 or web server 108.

In the depicted embodiment, user 154 sends, via client device 150, a request 160 to the server system 102 to perform an operation 162. For example, in various embodiments the server system 102 is operable to perform various different types of operations for a requesting user as part of the service(s) it provides. In the non-limiting embodiment in which the server system 102 provides an online payment service, these operations may include transferring funds from one user account to another, adding a credit card or bank account as a funding source, logging into a user account, modifying a user's account information 134, etc. Note again, however, that this embodiment is provided merely as one non-limiting example and, in other embodiments server system 102 may be operable to provide any suitable set of operations as part of the service(s) it provides.

In various embodiments, in response to the request 160 to perform an operation 162, the disclosed techniques may select one or more machine learning models 140 for execution on the client device 150 to determine whether to authorize the requested operation 162. For example, as shown in FIG. 1, data store 130 may store various machine learning models 140A-140N (or simply "models 140") that may be used to assess the level of risk associated with a requested operation 162 and, based on that level of risk, determine whether to authorize the requested operation. In various embodiments, the risk server 120 may provide various items of data, including a machine learning model 140 and encrypted input data 142, to a client device 150 for use in evaluating the level of risk associated with the requested operation 162.

In the depicted embodiment, risk server 120 includes model selection module 122. In various embodiments, the model selection module 122 is operable to select the appropriate machine learning model 140 to provide to a client device 150 to determine whether to authorize a requested operation 162. In some embodiments, the model selection module 122 may select the machine learning model 140 based on the type of operation 162 that is specified in the request 160. For example, as noted above the server system 102 may provide a wide array of different operations that are, potentially, available to requesting users. In various embodiments, some or all of these different types of operations may be associated with one or more machine learning models 140 that are used as part of an authorization process to determine whether to authorize a given request to perform an operation of that type. Stated differently, the various machine learning models 140 may be linked to their corresponding operation types such that, when request to perform an operation of a given type is received by the server system 102, the model selection module 122 may retrieve the appropriate model 140 for use in determining whether to authorize the requested operation. In some embodiments, model selection module 122 may maintain or have access to a table (or other suitable data structure) that provides a mapping from various operations to corresponding models 140 and may use this table to lookup the appropriate machine learning model 140 to retrieve for the particular requested operation 162.

Once retrieved by the model selection module 122, server system 102 may send the machine learning model 140 to the client device 150. For example, in some embodiments, in response to the request 160, the web server 108 may retrieve a webpage associated with the requested operation 162 and the selected machine learning model 140 may be included in or with the webpage data sent to the client device 150. In other embodiments, however, the machine learning model 140 may also be sent to the client device 150 before or after any webpage data associated with the requested operation 162.

Risk server 120 of FIG. 1 further includes input data retrieval module 124 and input data encryption module 126. Input data retrieval module 124, in various embodiments, is operable to retrieve one or more items of data that (once encrypted) are to be used as input to the machine learning model 140 sent to the client device 150. For example, to generate model output data corresponding to a level of risk associated with a requested operation 162, a machine learning model 140 may take, as input, a feature vector having a set of encrypted data values that correspond to various attributes of the user 154, the request 160, the operation 162, etc. In various embodiments, one or more of the encrypted data values in a feature vector may be based on one or more items of data maintained or computed by the server system 102. As a non-limiting example, in some embodiments this input data may include (or be based on) historical account data (e.g., user activity data) associated with the user account of the user 154, such as the previous transactions performed via the user account over a particular time period (e.g., the last one month, three months, six months, etc.). In some such embodiments, the data store 130 may maintain account information 134 associated with various user accounts with the server system 102 and, in response to the request, the input data retrieval module 124 may retrieve the appropriate items of input data for the selected machine learning model 140. Further note that, in some embodiments, one or more of the inputs to a machine learning model 140 may be dynamically generated at runtime, e.g., by the risk server 120, based on the user account's account information 134.

Input data encryption module 126, in various embodiments, is operable to encrypt one or more input data values to generate the encrypted input data 142. Note that, in various embodiments, it may be desirable to prevent the details of the machine learning models 140 from being revealed to the public. For example, if a malicious user were to discover the inner workings of the machine learning models 140 used to perform authorization decisions, that malicious user may adjust their attacks accordingly in an attempt to circumvent the defenses of the server system 102 and perform fraudulent (or otherwise malicious) operations via the server system 102. To address this problem, various disclosed embodiments utilize homomorphic encryption to ensure that useful information regarding the operation of the machine learning models 140 is not revealed to the public. As will be appreciated by one of skill in the art with the benefit of this disclosure, homomorphic encryption is a form of encryption in which computations are performed on encrypted input data such that the resulting output value is also encrypted. When this output value is then decrypted, the resulting value is the same as the value that would have been reached had the computations been performed on decrypted input data. Utilizing homomorphic encryption in the context of the present disclosure presents various technical benefits. For example, as described in detail below with reference to FIG. 2, various embodiments of the disclosed techniques include training the machine learning models 140, at least in part, using encrypted training data such that, once trained, the models 140 are operable to run on encrypted input data. By running these models 140 on encrypted input data 142, the server system 102 is not revealing, to the user 154, the details of the input utilized by the machine learning models 140. Stated differently, by encrypting the input to the models 140, the public is unaware of what that input is and, therefore, cannot gain useful information that may be used to circumvent the model 140.

In various embodiments, that the encrypted input data 142 is generated by encrypting the input data values, retrieved by the input data retrieval module 124, using one or more cryptographic keys that are not accessible to the client device 150 or the user 154. For example, in some embodiments, the risk server 120 may create one or more cryptographic keys (e.g., a public-private key-pair) that are not exposed to users or devices outside of the server system 102. As described in more detail below with reference to FIG. 2, these one or more cryptographic keys (e.g., a public key from a public-private key pair) may be used to encrypt the training data used to train the machine learning models 140. When generating the encrypted input data 142, the input data encryption module 126 may use this same key to encrypt one or more of the data values retrieved by the input data retrieval module 124. Note that the input data encryption module 126 may utilize various encryption algorithms, techniques, and libraries in generating the encrypted input data 142. As one non-limiting example, the input data encryption module 126 may generate the encrypted input data 142 using the HElib software library that implements homomorphic encryption using the Brakerski-Gentry-Vaikuntanathan (BGV) scheme. Note, however, that this embodiment is provided merely as one non-limiting example and, in other embodiments, other suitable encryption techniques may be used to generate the encrypted input data 142.

The encrypted input data 142 may be sent to the client device 150 before, at the same time as, or after the machine learning model 140 is sent to the client device 150. In some embodiments, the server system 102 sends the machine learning model 140 along with the webpage data prior to sending the encrypted input data 142, allowing the webpage to render at the client device 150 while the risk server 120 retrieves and encrypts the encrypted input data 142. In some such embodiments, this approach may reduce latency and improve the user experience by allowing user 154 to interact with the webpage without waiting for the encrypted input data 142 to be sent.

Once received from the server system 102, the client device 150 may run the machine learning model 140 using the encrypted input data 142. In various embodiments, the machine learning model 140 is provided in a format that may be executed by software application 152 on the client device 150. As non-limiting examples, in some embodiments the machine learning model 140 is provided as an ONNX™ model or a TensorFlow™ Lite model, which, as will be appreciated by one of skill in the art with the benefit of this disclosure are JavaScript™ models that may be run on the client device 150 either in a web browser or by a software application using Node.js.

In various embodiments, by running the model 140 using the encrypted input data 142, the client device 150 generates model output data. As used herein, the term "model output data" refers to one or more values, generated using a machine learning model 140, which correspond, directly or indirectly, to a level of risk associated with the requested operation 162. Note that, in some embodiments, the model output data may be generated in a decrypted format that indicates the level of risk associated with a requested operation 162. For example, in some such embodiments, encrypted input data 142 may be applied to the machine learning model 140 to generate model output data that indicates the probability that operation 162 to which the encrypted input data 142 corresponds is malicious. As one non-limiting example, in some embodiments a machine learning model 140 may generate model output data that is on a scale from 0.0-1.0 and that indicates the probability that a requested operation 162 should be classified as "malicious," with values closer to 0.0 indicating that the operation 162 should be classified as "not malicious" and values closer to 1.0 indicating an increasing probability that the operation 162 should be classified as "malicious." Note, however, that this embodiment is provided merely as one non-limiting example and, in other embodiments, the model output data may be generated on any suitable range or scale (e.g., −1 to +1, 1 to 10, etc.).

Further note that, in some embodiments, the model output data may be generated, using the machine learning model 140, in an encrypted format such that, when decrypted, the model output data indicates a level of risk associated with the requested operation 162. For example, in some such embodiments, the model output data corresponds to the level of risk associated with the requested operation 162 in that the model output data, once decrypted, indicates a probability that the operation 162 is malicious. Generating the model output data in an encrypted format may provide various technical benefits, according to some embodiments. For example, by generating model output data in an encrypted format, the disclosed techniques prevent user 154 from gleaning information about the details of the model 140 based on the output data it produces. For example, if a malicious user were provided with a model that generates output data in an decrypted format (that is, in a format that directly indicates a level of risk associated with operation 162), the malicious user may then attempt to "map" the model by monitoring the output data generated for different input values. In doing so, a malicious user may be able to discern information about the model that may be useful to the user in designing attacks on the server system 102. In various embodiments, however, by utilizing machine learning models 140 that generate model output data in an encrypted format, the disclosed techniques prevent malicious users from performing such mapping operations, thereby further securing the model 140 from disclosure to the public.

In various embodiments, the model output data may be used to determine whether to authorize the requested operation 162. For example, in some embodiments the client device 150 may return the model output data to the server system 102, where the risk server 120 may determine whether to authorize the requested operation 162 based on a value of the model output data. For instance, once it receives the model output data, the risk server 120 may decrypt it using one or more of the cryptographic keys that it maintains (e.g., a private key corresponding to the public key used to generate the encrypted input data 142) to generate decrypted model output data. The risk server 120 may then apply one or more authorization rules to determine whether to authorize the operation 162. Consider, as one non-limiting example, an embodiment in which the decrypted model output data is generated on a scale from 0.0-1.0, with values closer to 1.0 indicating an increased probability that the requested operation 162 is high-risk. In such an embodiment, the risk server 120 may apply an authorization rule providing that requests with corresponding model output values above some predetermined threshold value (e.g., 0.5, 0.75, 0.85, etc.) are to be denied. Note, however, that this embodiment is provided merely as one non-limiting example. Further, in various embodiments, the authorization rules may be specific to the particular operation 162 being requested. Based on the outcome of the authorization rule(s), the server system 102 may determine whether to authorize the requested operation 162. If, based on the model output data, the requested operation 162 is not immediately authorized, the server system 102 may take one or more additional actions, such as denying the request 160, performing further risk analysis (e.g., applying a heavier tier-two machine learning model to evaluate the requested operation 162), requesting additional authentication operations (e.g., multi-factor authentication) from the user 154, etc.

Figure 2:
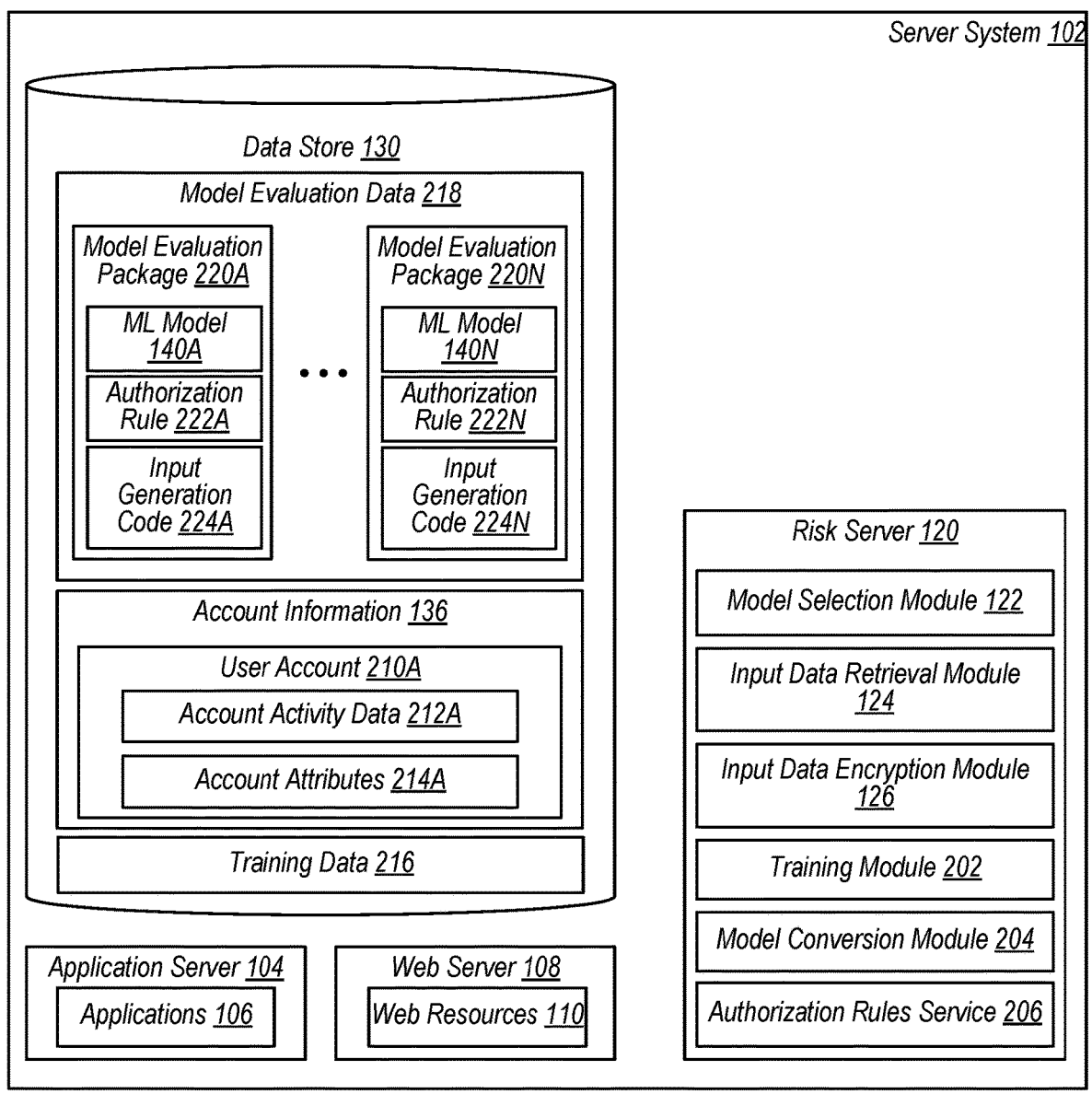
FIG. 2 is a block diagram illustrating an example server system, according to some embodiments.

Turning now to FIG. 2, a block diagram 200 illustrates an example server system 102, according to some embodiments. In the depicted embodiment, server system 102 includes application server 104, web server 108, risk server 120, and data store 130. Note that, in FIG. 2, although a single data store 130 is shown included within the server system 102, this simplified embodiment is provided merely as a non-limiting example. In other embodiments, server system 102 may include (or have access to) any suitable number of local or remote data stores, implemented using any suitable data storage technology. Additionally note that although a single application server 104 and web server 108 are shown in FIG. 2, this simplified embodiment is provided clarity and, in other embodiments, server system 102 may include any suitable number of application servers 104 and web servers 108.

As in FIG. 1, the risk server 120 of FIG. 2 includes model selection module 122, input data retrieval module 124, and input data encryption module 126. Additionally, in the embodiment depicted in FIG. 2, risk server 120 further includes training module 202, model conversion module 204, and authorization rules service 206. In various embodiments, training module 202 is operable to train various machine learning models 140 based on training data 216. Training data 216 may include different sets of training data that may be used to train different machine learning models 140 to be used to authorize various operations offered by the server system 102.

As noted above, however, in various embodiments it is beneficial to train the machine learning models 140 so that they may be run on encrypted input data 142. Accordingly, in various embodiments, the training module 202 is operable to train the machine learning models 140 using encrypted training data such that, once trained, the machine learning models 140 are operable to generate model output data, for a requested operation 162, using encrypted input data 142. In various embodiments, training module 202 is operable to encrypt the training data 216 using any of various suitable encryption algorithms, techniques, and libraries. As a non-limiting example, in some embodiments the training module 202 may encrypt the training data 216 using the HElib software library, though other suitable libraries may also be used. Note that, in various embodiments the training module 202 encrypts the training data 216 using one or more cryptographic keys that are not accessible to the client device 150 or the user 154. For example, in some embodiments, the risk server 120 may create one or more cryptographic keys (e.g., a public-private key-pair) that are not exposed to users or devices outside of the server system 102. One or more of these cryptographic keys (e.g., a public key from a public-private key pair) may be used to encrypt (at least a portion of) the training data 216, generating a training dataset of training samples that have encrypted data values. Non-limiting examples of a training sample that may be included in a training dataset are described in detail below with reference to FIG. 3A. For the purposes of the present discussion, note that, in some embodiments, a training sample may be a feature vector that includes a set of encrypted data values. In some embodiments, all of the data values in the training sample feature vector may be encrypted in the same manner (e.g., using the same encryption algorithm, the same cryptographic key(s), etc.). In other embodiments, however, multiple different cryptographic techniques or keys may be used to encrypt different data values in the training sample feature vector, which as described below may provide various technical benefits.

Training module 202 may train the machine learning models 140 using any of various suitable learning algorithms. In some embodiments, for example, a machine learning model 140 may be an artificial neural network ("ANN") implemented using any suitable neural network architecture. For example, in some embodiments, an ANN may be implemented using a feed-forward neural network architecture, such as a multi-layer perceptron ("MLP") architecture or a convolutional neural network ("CNN") architecture. In other embodiments, however, an ANN may be implemented using a recurrent neural network ("RNN"), such as a long short-term memory ("LSTM") model. In further embodiments, an ANN may be implemented using an architecture that includes one or more layers of a feed-forward architecture and one or more layers of an RNN architecture. Note that these specific examples are provided merely as non-limiting embodiments, however, and that, in other embodiments, various suitable neural network architectures may be used, as desired. Further, note that multiple different machine learning algorithms may be used in building the various machine learning models 140. For example, in addition to (or instead of) using an ANN, one or more of the machine learning models 140 may be built as a decision tree model, a SGD classifier, a Naïve Bayes model, a KNeighbors classifier model, a linear SVC model, or an ensemble model that utilizes one or more machine learning algorithms during a training phase to generate the machine learning models 140.

The training module 202 may utilize any of various optimization algorithms to iteratively optimize the parameters of the machine learning models 140 based on the encrypted input data. As a non-limiting example, in embodiments in which a machine learning model 140 is implemented as an ANN, the training module 202 may use stochastic gradient descent, adaptive moment estimation ("Adam"), or any other suitable optimization algorithms in training the machine learning model. In training the various machine learning models 140, the training module 202 may using any of various suitable machine learning libraries, including Pandas™, Scikit-Learn™ TensorFlow™ Lite, ONNX™, or any Other Suitable Machine Learning library.

Model conversion module 204, in various embodiments, is operable to convert a machine learning model 140 into a format that can be run on a client device, such as client device 150. Consider, as a non-limiting example, an embodiment in which a machine learning model 140 has been built, by the training module 202, using the TensorFlow™ machine learning platform in a format that is suitable for production deployment on one or more machines within server system 102. In such an embodiment, model conversion module 204 may convert the machine learning model 140 from this production format into a format that is suitable for deployment on a client device (e.g., a laptop computer, desktop computer, smartphone, tablet computer, or embedded device). Continuing with the current example, the model conversion module 204 may convert the TensorFlow™ model into a TensorFlow™ Lite model. As another non-limiting example, in some embodiments a machine learning model 140 may be converted into an ONNX™ model that is suitable for deployment on a client device. In still other embodiments, one or more of the machine learning models 140 may be generated in a proprietary format that is specific to server system 102. In such embodiments, the model conversion module 204 may convert the model 140 into a format that is suitable for execution by a client device. Further note that, in some embodiments, rather than converting a model from a production format into a client device format, the training module 202 may generate the machine learning models 140 in the client device format in the first instance. As will be appreciated by one of skill in the art with the benefit of this disclosure, utilizing a format for the machine learning models 140 that is suitable for deployment on a client device may offer various performance tradeoffs. For example, in some embodiments, formatting the machine learning models 140 to be executed on a client device may reduce the file size and the computational complexity (e.g., by reducing the floating point precision of variables) of the models 140 while also reducing the accuracy of the predictions generated using the models 140 (e.g., by 1-3%).

In FIG. 2, data store 130 is shown storing account information 136, which may include information associated with various user accounts 210A-210N with the server system 102. For example, in the depicted embodiment, account information 136 includes information corresponding to user account 210A, including account activity data 212A and account attributes 214A. Non-limiting examples of account activity data 212 includes information corresponding to prior user sessions with user account 210A, such as account login dates, times, durations, operations performed during those sessions, prior identified instances of malicious activity, etc. Non-limiting examples of account attributes 214A include the date the user account 210A was created, the geographic region in which the user account 210A was created or is currently associated, known devices associated with the user account 210A, etc. As discussed above, in various embodiments the input data retrieval module 124 is operable to retrieve one or more items of data from the account information 136 for use as input to a machine learning model 140. Assume, for example, that user 154 of FIG. 1 is associated with user account 210A with the server system 102. In such an embodiment, the input data retrieval module 124 may retrieve any suitable set of data from the account information 136 associated with the user account 210A to serve, once encrypted, as input to a machine learning model 140 selected for the request 160.

In FIG. 2, data store 130 is further shown storing model evaluation data 218, which includes various model evaluation packages 220A-220N. In the non-limiting embodiment depicted in FIG. 2, the model evaluation packages 220 include one or more machine learning models 140, one or more authorization rules 222, and input generation code 224. In various embodiments, the model evaluation packages 220 may correspond to specific operations that are offered via the server system 102. For example, in various embodiments, a given operation may be associated with one or more model evaluation packages 220 that may be used (e.g., by client device 150) to determine whether to authorize a request to perform that operation. In some embodiments, the disclosed techniques include creating the various model evaluation packages 220 in advance (that is, prior to using the packages 220 to evaluate a requested operation) so that, when a request 160 to perform operation 162 is received, the model selection module 122 may retrieve and send the appropriate model evaluation package 220 to the client device 150. As noted above, the model selection module 122 may select the appropriate model evaluation package 220 to retrieve for a given request based on a table (or other suitable data structure) that specifies a mapping between an operation and a corresponding package 220.

Note that, in some embodiments, a given operation may be associated with multiple different model evaluation packages 220. Consider again the non-limiting embodiment described above in which the server system 102 provides an online payment service and, as one of the potential operations offered to its users, the server system 102 enables one user to transfer funds to another (e.g., as payment for an online financial transaction). In such an embodiment, the model evaluation data 218 may include two model evaluation packages 220, e.g., packages 220B and 220C, for this operation. The first model evaluation package 220B may be designed for use in instances in which the client device 150 is a laptop or desktop computer and the second model evaluation package 220C may be designed for use in instances in which the client device 150 is a smartphone or tablet computer. For instance, in this non-limiting example, the machine learning model 140B included in package 220B may have higher computational requirements, and provide a higher degree of accuracy than, the machine learning model included in package 220C. Configuring the model evaluation packages 220B-220C in such a manner may provide various technical benefits. For example, in many instances, laptop and desktop computers will have more available computing resources (e.g., available memory, processing compute power, etc.) than smartphones and tablet computers. Accordingly, in instances in which the client device 150 is a laptop or desktop computer, more computationally demanding models 140 (e.g., model 140B) may be executed at the client device 150 without causing significant additional burden to the client device 150, enabling the more accurate model 140B to be used in determining whether to authorize a requested operation 162.

In various embodiments in which a given operation may be associated with multiple different model evaluation packages 220 (or simply with different machine learning models 140), the disclosed techniques may include determining which package 220 (or model 140) to send to the client device 150 based on a device type of the client device 150. For example, in some such embodiments, the server system 102 may perform device fingerprinting operations (e.g., based on the information included in the request 160) to determine the device type of the client device 150 and, based on that device type (and, optionally, the requested operation 162) the model selection module 122 selects the appropriate package 220 or model 140 to send to the client device 150.

As noted above, in various embodiments the server system 102 may apply one or more authorization rules to determine, based on the model output data, whether to authorize the requested operation 162. For example, in some such embodiments, an authorization rules service 206 may implement one or more rules that are usable to determine whether to authorize the request 160 depending on the value(s) of the model output data returned, by the client device 150, to the server system 102. In other embodiments, however, the determination of whether to authorize the requested operation 162 may be performed (in whole or in part) on the client device 150. For example, as shown in FIG. 2, model evaluation packages 220 further include authorization rules 222, which, in various embodiments, are usable (e.g., by the client devices) to determine whether to authorize requested operations based on the model output data generated by the respective machine learning models 140. Stated differently, in various embodiments, rather than (or in addition to) applying authorization rules at the server system 102, the disclosed techniques may include sending one or more authorization rules 222 to the client device 150 such that the authorization determination may be made, based on the model output data, locally on the client device 150. In various embodiments, the authorization rules 222 are operable to determine whether to authorize the request 160 based on the model output data, which, as noted above, may itself be an encrypted value. In various embodiments the authorization rules 222 constructed, by the authorization rules service 206, for the specific operations for which they are being applied. For example, authorization rules service 206 may include rules usable to determine whether to authorize the various operations that are available via the server system 102. In creating a model evaluation package 220, such as model evaluation package 220A, the authorization rules service 206 may retrieve one or more authorization rules 222A used to determine whether to authorize a particular operation 162A (not specifically shown, for clarity) based on the model output data generated by the corresponding machine learning model 140A. These one or more authorization rules 222A may be included, along with the model 140A, input generation code 224A, relevant software libraries, etc., in the model evaluation package 220A used to determine whether to authorize a request to perform the operation 162A.

As noted above, in various embodiments the machine learning models 140 are operable to generate model output data based on encrypted input data 142. In some embodiments, an entirety of the encrypted input data 142 for a machine learning model 140 is generated at the server system 102 (e.g., by input data encryption module 126), as discussed above. For example, as noted above, in various embodiments the encrypted input data 142 may be formatted as a feature vector having a set of encrypted data values. Accordingly, in some embodiments, all of the encrypted data values in the feature vector may be generated at the server system 102 and sent, as encrypted input data 142, to the client device 150. In other embodiments, however, at least a portion of the encrypted input data 142 (e.g., one or more of the encrypted data values in an input feature vector) may be generated at the client device 150 (e.g., at runtime of the model 140). For example, as shown in FIG. 2, the model evaluation packages 220 include input generation code 224, which, in various embodiments, is code (e.g., provided as JavaScript™, Python™, or in any other suitable language) usable by the client device 150 to generate at least a portion of the encrypted input data 142 used by the machine learning model 140.

In some embodiments, this additional encrypted input data is based on one or more values provided, by the user 154 of client device 150, into a webpage provided by the server system 102. For example, as noted above, in various embodiments the server system 102 may return, to the client device 150 in response to the request 160, a webpage corresponding to the requested operation 162. In some such embodiments, the webpage may include one or more forms (or other input elements) that the user 154 may use to provide various items of data. In some embodiments, the input generation code 224 is operable to receive these input values from the user 154, encrypt these input values to generate additional encrypted input data for the machine learning model 140, and apply the additional encrypted input data as input to the machine learning model 140. Non-limiting examples of such embodiments are described in more detail below with reference to FIGS. 3A-3B. Additionally note that, in some embodiments, the encrypted input data 142 may be generated entirely at the client device 150 using the input generation code 224.

Though not separately shown in FIG. 2 for clarity, in some embodiments a model evaluation package 220 may include one or more software libraries utilized by the machine learning model(s) 140 in that package 220. As a non-limiting example in an embodiment in which the machine learning model 140A included in model evaluation package 220A is a TensorFlow™ Lite model, the model evaluation package 220A may include the TensorFlow.js JavaScript library for training and deploying models in web browsers and in applications that use Node.js.

Note that the embodiment depicted in FIG. 2 is provided merely as one non-limiting example and, in other embodiments, the data included in a model evaluation packages 220 may vary. For example, in embodiments in which the model output data is analyzed at the server system 102 to determine whether to authorize a requested operation 162, the model evaluation packages 220 may not include the authorization rules 222. Additionally, in embodiments in which the machine learning models 140 are executed at the client devices 150 using only encrypted input data 142 generated at the server system 102, the model evaluation packages 220 may not include the input generation code 224. Further note that, in some embodiments, the types of data included in one package 220 may differ from the types of data included in another package 220. As one non-limiting embodiment, for a first operation 162D (not separately shown in FIG. 2 for clarity), a corresponding model evaluation package 220D may include, in addition to a machine learning model 140D and accompanying libraries, both an authentication rule 222D and input generation code 224D. Continuing this non-limiting example, for a separate operation 162E (again not separately shown, for clarity), a corresponding model evaluation package 220E may include, in addition to a machine learning model 140E and accompanying libraries, an authentication rule 222E but not any input generation code.

As noted above, in various embodiments the encrypted input data 142 for a machine learning model 140 may be generated by both the server system 102 and the client device 150. For example, in addition to the portion of the encrypted input data 142 generated by the server system 102, at least a portion of the encrypted input data 142 (e.g., one or more of the encrypted data values in an input feature vector) may be generated at the client device 150 using the input generation code 224. Such embodiments may be viewed as an application of secure multi-party computation ("SMPC") in which two parties (e.g., the server system 102 and the client device 150) are cooperating to compute a value (e.g., the model output data) using a machine learning model 140 while keeping the input to the model 140 secure.

Figure 3A:
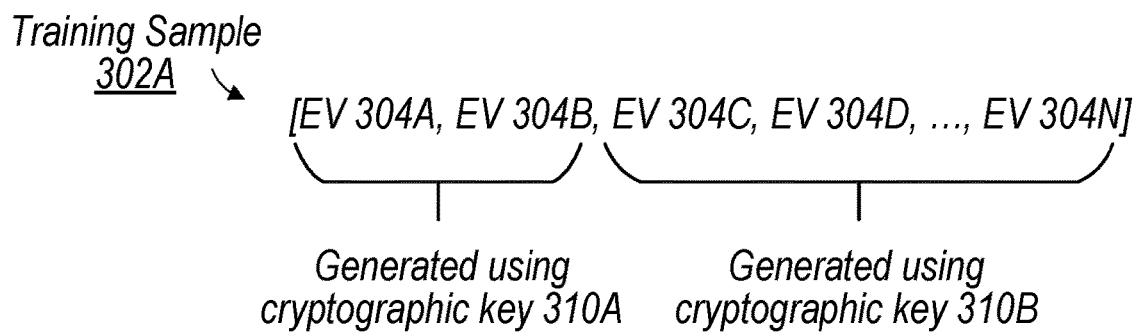
FIG. 3A is a diagram illustrating an example training sample that includes one or more encrypted data values, according to some embodiments.
Figure 3B:
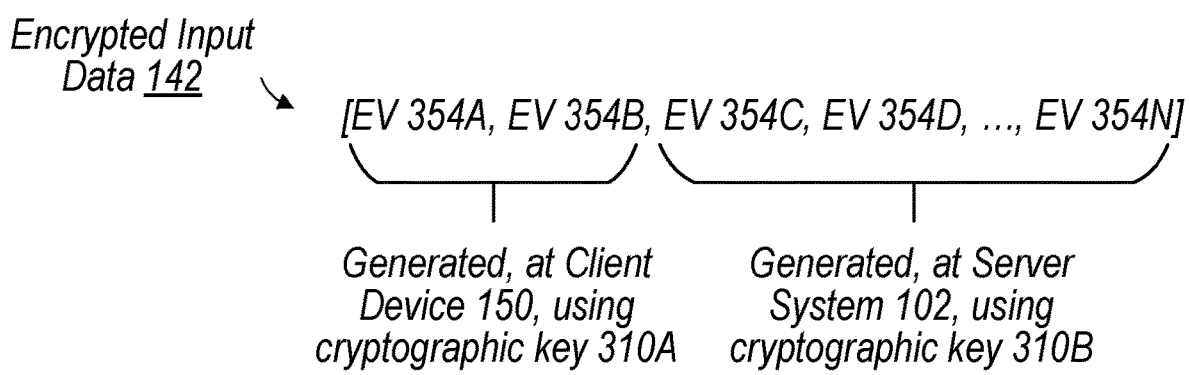
FIG. 3B is a diagram illustrating encrypted input data that may be used as an input to a machine learning model, according to some embodiments.

Referring now to FIGS. 3A-3B, diagrams 300 and 350 respectively depict a training sample 302A used to train a machine learning model 140 and encrypted input data 142 used as input to that model 140, according to one non-limiting embodiment. In FIG. 3A, training sample 302A is a feature vector that includes a set of encrypted values EV 304A-304N. For example, in various embodiments the training module 202 may encrypt various data values from training data 216 to generate the training sample 302A. As indicated in FIG. 3A, different encrypted values in the training sample 302A have been encrypted using different cryptographic keys. Specifically, EV 304A-304B have been encrypted using cryptographic key 310A and EV 304C-304N have been encrypted using cryptographic key 310B. Note that the encrypted values 304A-304N may be encrypted using any of various suitable encryption algorithms or techniques and the cryptographic keys 310 may be any of various suitable types of cryptographic keys usable by the selected encryption algorithms or techniques. In various embodiments, the risk server 120 may generate a training dataset that includes many (e.g., thousands, hundreds of thousands, millions, etc.) of training samples 302A-302N that have been encrypted in the same manner and, as described above, use the training dataset to train one or more machine learning models 140.

In FIG. 3B, encrypted input data 142 is also a feature vector that includes a set of encrypted values 354A-354N. In the depicted embodiment, two of the encrypted values (e.g., EV 354A-354B) have been generated by the client device 150 (e.g., using the input generation code 224) and the remaining encrypted values (e.g., EV 354C-354N) have been generated and sent by the server system 102. Further, in the depicted embodiment, the encrypted values 354A-354B have been encrypted using cryptographic key 310A while the encrypted values 354C-354N have been encrypted using cryptographic key 310B. Note that, in various embodiments, corresponding encrypted values in the training samples 302 and the encrypted input data 142 may be encrypted using the same cryptographic techniques. For example, in various embodiments, the encrypted values EV 304A-304N may correspond to the same attributes (e.g., of an operation performable via the server system 102) as the encrypted values 354A-354N in the encrypted input data 142. For instance, in some embodiments, encrypted values 304A and 354A are both encrypted values that correspond to the same attribute of a requested operation of a particular operation type. In some such embodiments, by encrypting the encrypted values 354A-354B using the same cryptographic key 310A as the encrypted values 304A-304B, the disclosed techniques ensure that corresponding encrypted values in the training samples 302 and the encrypted input data 142 are encrypted in the same manner.

Note that, in various embodiments, encrypting the encrypted values 354A-354B at the client device 150 using a different cryptographic key than the cryptographic key 310B used to encrypt the encrypted values 354C-354N at the server system 102 may provide various technical benefits. For example, by utilizing different keys (or, in some embodiments, utilizing different encryption algorithms instead of or in addition to different keys) at the client device 150 may further prevent a malicious user from gaining any useful information regarding the content of the encrypted values 354C-354N.

Figure 4:
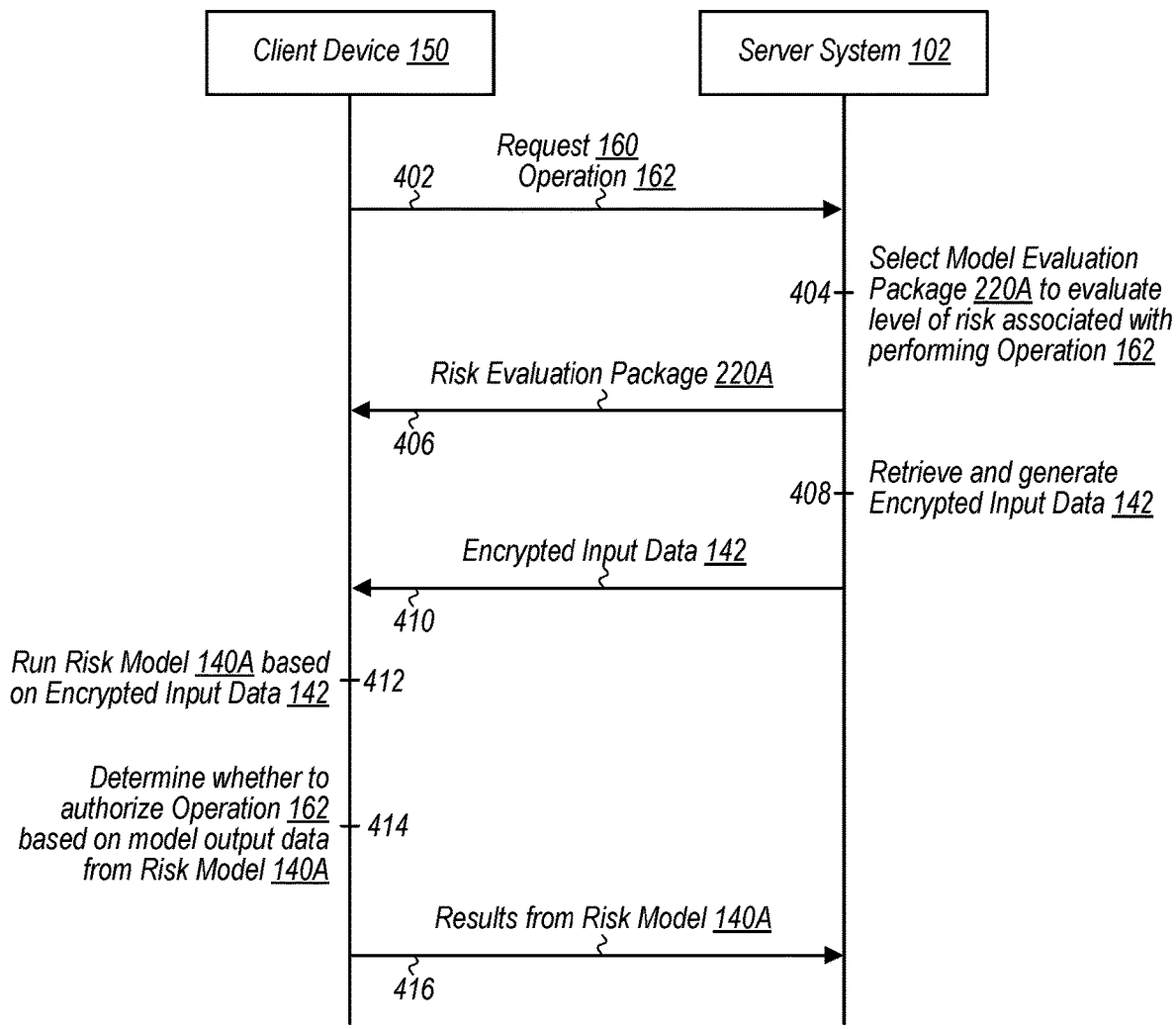
FIG. 4 is a communication diagram illustrating an example exchange between a server system and a client device, according to some embodiments.

Turning now to FIG. 4, a communication diagram 400 illustrates an example exchange between a server system 102 and client device 150 to execute a machine learning model at the client device 150, according to some embodiments.

At 402, in the illustrated embodiment, client device 150 sends a request 160 (e.g., an HTTP request), to server system 102, to perform an operation 162 via the server system 102. For example, as noted above, the server system 102 may provide various services to end users, such as user 154, and enable the end users to request one or more operations via a website hosted by (or on behalf of) the server system 102. In various embodiments, the user 154 may send the request 160 via the software application 152, which, as non-limiting examples, may be a web browser, a software application associated with a service provided via the server system 102, a software application associated with a service provided by a third-party that utilizes one or more services provided via the server system 102, etc.

At 404, in the illustrated embodiment, the server system 102 selects a model evaluation package 220 to evaluate the level of risk, posed to the server system 102, associated with the performance of operation 162. For example, as described above, the model selection module 122 may select the appropriate model evaluation package 220 to send to the client device 150 based on the type of the operation 162, the device type of the client device 150, attributes associated with a user account 210 of the user 154, or any other suitable factors. In the depicted embodiment, the server system 102 selects and sends model evaluation package 220A to the client device 150, as shown at 406. Assume that, in the non-limiting embodiment of FIG. 4, the model evaluation package 220A includes machine learning model 140A, one or more software libraries (e.g., machine learning libraries) utilized by the machine learning model 140A, and an authorization rule 222A operable to determine whether to authorize the requested operation 162 based on the model output data generated by the model 140A.

At 408, in the illustrated embodiment, the server system 102 retrieves and generates (at least a portion of) the encrypted input data 142. For example, the input data retrieval module 124 may retrieve one or more data values from the account information 136 associated with the user account 210A of the user 154, such as the account activity data 212A or the account attributes 214A. Note that, in some embodiments, the risk server 120 may generate one or more data values for use in the encrypted input data 142 based on these retrieved data values. Further, in various embodiments, the input data encryption module 126 may encrypt these retrieved (or generated) data values to generate the encrypted input data 142. In some embodiments, the encrypted input data 142 includes a feature vector that includes a set of one or more encrypted data values. At 410, the server system 102 sends the encrypted input data 142 to the client device 150. Note that, although sent asynchronously in the depicted embodiment, in some embodiments the encrypted input data 142 may be sent to the client device 150 at the same time as the model evaluation package 220A.

At 412, in the illustrated embodiment, the client device 150 runs the machine learning model 140A based on the encrypted input data 142 to generate the model output data. As noted above, by running the model 140A on encrypted input data 142, the disclosed techniques protect the details of the model 140A from being discovered by the user 154, according to some embodiments. At 414, in the illustrated embodiment, the authorization rule 222A is used to determine whether to authorize the requested operation 162 based on the model output data from the model 140A. Non-limiting examples of the operation of authorization rule 222 are described above with reference to FIG. 2.

At 416, in the illustrated embodiment, the client device 150 sends the results from the model 140A back to the server system 102. As a non-limiting example, in embodiments in which the authorization rule 222A is run on the client device 150, the client device 150 may send back an authorization determination generated using the authorization rule 222A. Further, in some embodiments, the client device 150 will return information corresponding to the execution of the model 140A back to the server system 102 (e.g., for post-processing analysis). For instance, in some such embodiments, the client device 150 may send back, to the server system 102, the model output data and the encrypted input data 142 (e.g., in embodiments in which at least a portion of the encrypted input data is generated at the client device 150).

Example Methods

Referring now to FIG. 5, a flow diagram illustrating an example method 500 for executing one or more machine learning models on a client device to determine whether to authorize a requested operation is depicted, according to some embodiments. In various embodiments, method 500 may be performed by server system 102 of FIG. 1. For example, server system 102 may include (or have access to) a non-transitory, computer-readable medium having program instructions stored thereon that are executable by server system 102 to cause the operations described with reference to FIG. 5. In FIG. 5, method 500 includes elements 502-510. While these elements are shown in a particular order for ease of understanding, other orders may be used. In various embodiments, some of the method elements may be performed concurrently, in a different order than shown, or may be omitted. Additional method elements may also be performed as desired.

At 502, in the illustrated embodiment, the server system 102 receives, from a client device 150, a request 160 to perform a first operation 162 via a service provided by the server system 102. At 504, in the illustrated embodiment, the server system 102 determines that the first operation is associated with at least one of a plurality of machine learning models 140 that are executable at the client device 150 to determine whether to authorize the first operation. For example, as discussed above with reference to FIG. 1, model selection module 122 may, in response to the request 160, perform a lookup operation to determine whether the requested operation 162 is associated with one or more machine learning models 140.

At 506, in the illustrated embodiment, the server system 102 selects a first one of the plurality of machine learning models 140 to send to the client device 150. For example, in response to determining that the requested operation 162 is associated with at least one machine learning model 140, the model selection module 122 may select one or more of those machine learning models 140 to send to the client device 150 for execution. As shown in FIG. 5, in various embodiments the machine learning model 140 is executable, by the client device 150, to generate model output data for the first operation 162 based on one or more encrypted input data values that are encrypted (e.g., by the server system 102) with a cryptographic key inaccessible to the client device 150. Further, as described above, in various embodiments the model output data corresponds to a level of risk associated with the server system 102 performing the first operation 162.

Note that, in some embodiments, this selection at element 506 is performed based on an operation type of the requested operation 162. In other embodiments, model selection module 122 may (instead of or in addition to making the selection based on the operation type of operation 162), select the machine learning model 140 to send to the client device 150 based on a device type of the client device 150. For example, in one non-limiting example embodiment, element 506 may include the server system 102 determining (e.g., through device fingerprinting or any other suitable technique) that the client device 150 is a mobile computing device and, in response to the determining, selecting the first machine learning model (e.g., model 140A), from a set of machine learning models (e.g., models 140A-140C) associated with an operation type of the first operation 162, to send to the client device 150. In this non-limiting example, the first machine learning model 140A may have lower computational requirements than at least one of the set of machine learning models 140B-140C. As another non-limiting example, in some embodiments element 506 may include the server system 102 determining that the client device is one of a laptop or desktop computer and, in response, select the first machine learning model (e.g., model 140B), from a set of machine learning models (e.g., models 140A-140C) associated with the operation type of the first operation 162, to send to the client device 150, where the selected machine learning model 140B has higher computational requirements than at least one of the set of machine learning models 140A-140C. Note that the machine learning model sent to the client device may be transmitted at various times. In some instances, the model (e.g. a lightweight model) may be sent to the client device in response to the client device initiating a transaction; in other instances, one or more machine learning evaluation models may be sent to the client device in advance of the transaction (e.g. one or more models may be pre-stored on the client device).

At 508, in the illustrated embodiment, the server system 102 sends machine learning model evaluation data to the client device 150. In some embodiments, the machine learning model evaluation data may include data from a model evaluation package 220 of FIG. 2. For example, in some embodiments the machine learning model evaluation data includes a first machine learning model 140A. Further, in some embodiments, the machine learning model evaluation data may include input data to use for the machine learning model 140A, such as encrypted input data 142. As noted above, in various embodiments the encrypted input data 142 may include one or more encrypted input data values that are encrypted, by the server system 102, with a cryptographic key that is inaccessible to the client device 150.

Note that, in some embodiments, the machine learning model evaluation data may further include code (e.g., input generation code 224) executable, by the client device 150, to generate additional encrypted input data for the first machine learning model 140A. For example, in some embodiments, the server system 102 may return, to the client device 150, a webpage associated with the requested operation 162 and, in some such embodiments, the additional encrypted input data may be based on one or more values provided, by a user 154 of the client device 150, into this webpage. Additionally, as described above, in some embodiments the encrypted input data 142 provided by the server system 102 may be encrypted using a different encryption algorithm (or different cryptographic key) than the additional encrypted input data generated, using the input generation code 224, at the client device 150. For example, in some embodiments, the one or more encrypted input data values sent by the server system 102 (e.g., as part of encrypted input data 142) have been encrypted using a first encryption algorithm, and the input generation code 224 is executable to encrypt the one or more values, provided by the user 154, using a second encryption algorithm to generate the additional encryption input data. As another non-limiting example, in some embodiments the one or more encrypted input data values sent by the server system 102 have been encrypted, by the server system 102, using a first cryptographic key, and the input generation code 224 is executable, by the client device 150, to generate the additional encrypted input data for the machine learning model 140 using a second, different cryptographic key.

At 510, the server system 102 receives, from the client device 150, a response message that indicates whether the first operation is authorized based on the model output data. For example, as discussed above, in some embodiments the server system 102 sends, to the client device, an authorization rule 222 associated with the requested operation 162 that is operable to determine whether the operation 162 is authorized based, at least in part, on the model output data. In some such embodiments, the response message from the client device 150 may directly indicate whether the requested operation 162 is authorized. In other embodiments, however, the response message from the client device 150 may instead indirectly indicate whether the first operation 162 is authorized by specifying the model output data generated by the machine learning model 140 executed at the client device 150. For example, in some embodiments, the client device 150 may return the model output data to the server system 102, which may use the model output data to determine whether to authorize the requested operation 162. In some embodiments, for instance, the server system 102 may apply one or more authorization rules to determine whether to authorize the requested operation 162 (e.g., based on the value of the model output data relative to a threshold value specified for an authorization rule). If the server system 102 determines that the requested operation 162 does not pass the one or more authorization rules based on the model output data, the server system 102 may take one or more additional actions, such as denying the request 160 or initiating additional authorization operations. In some such embodiments, the server system may run one or more additional machine learning models (e.g., a more computationally intensive model) to generate additional model output data that provides a more accurate assessment of a level of risk associated with the requested operation 162 and, based on this additional model output data, the server system 102 may determine whether to authorize the request 160.

Note that, as described above in reference to FIG. 2, prior to receiving the request 160 to perform operation 162, method 500 may include training the machine learning models 140 using a training dataset of training samples that have encrypted data values. For example, in various embodiments, training module 202 may train the machine learning models 140 by encrypting training data 216 using a cryptographic key that is inaccessible to the client device. As described in detail above with reference to FIGS. 3A-3B, in some embodiments different portions of a training sample in the training dataset may be generated using different cryptographic algorithms, techniques, or keys. For example, in some embodiments, a particular training sample may include a first set of encrypted data values that have been encrypted using a first encryption algorithm and a second set of encrypted data values that have been encrypted using a second encryption algorithm. As another example, in some embodiments, a particular training sample may include a first set of encrypted data values that have been encrypted using a first cryptographic key and a second set of encrypted data values that have been encrypted using a second, different cryptographic key.

Referring now to FIG. 6, a flow diagram illustrating an example method 600 for executing one or more machine learning models on a client device to determine whether to authorize a requested operation is depicted, according to some embodiments. In various embodiments, method 600 may be performed by server system 102 of FIG. 1. For example, server system 102 may include (or have access to) a non-transitory, computer-readable medium having program instructions stored thereon that are executable by server system 102 to cause the operations described with reference to FIG. 6. In FIG. 6, method 600 includes elements 602-612. While these elements are shown in a particular order for ease of understanding, other orders may be used. In various embodiments, some of the method elements may be performed concurrently, in a different order than shown, or may be omitted. Additional method elements may also be performed as desired.

At 602, in the illustrated embodiment, the server system 102 accesses training data that includes training samples corresponding to prior operations performed, via a service provided by the server system 102, for a plurality of users. For example, training module 202 of FIG. 2 may access training data 216 that includes training samples corresponding to (potentially many) operations previously performed via one or more services provided via the server system 102. At 604, in the illustrated embodiment, the server system 102 generates encrypted training data that includes encrypted training samples corresponding to the training samples. For example, in some embodiments, a particular one of the encrypted training samples includes a plurality of encrypted data values corresponding to a particular one of the prior operations.

At 606, in the illustrated embodiment, the server system trains a first machine learning model 140 based on the encrypted training data such that, after training, the first machine learning model is operable to generate, based on encrypted input data, model output data corresponding to a level of risk associated with a particular type of operation. At 608, in the illustrated embodiment, the server system 102 converts the first machine learning model 140 into a format that is executable by client devices to generate the model output data. For example, in some embodiments the model conversion module 204 is operable to convert the first machine learning model 140 from a first format (e.g., a TensorFlow™ model) into a second format (e.g., a TensorFlow™ Lite model) that is executable by software application 152 executing on client device 150.

At 610, in the illustrated embodiment, the server system 102 receives, from a first client device 150, a request 160 to perform a first operation 162, of the particular type of operation, via the service provided via the server system 102. In some embodiments, for example, the request 160 to perform the first operation 162 is associated with a first user account 210A with the server system 102. At 612, in the illustrated embodiment, the server system 102 sends the first machine learning model 140 to the first client device 150. Further, in some embodiments, the method 600 further includes retrieving input data values for the first machine learning model 140, where the input data values are associated with the first user account 210A, encrypting the input data values using a cryptographic key that is inaccessible to the first client device 150 to generate a set of encrypted input data values, and sending the set of encrypted input data values to the first client device 150, where the first machine learning model 140 is operable to generate the model output data based on the set of encrypted input data values. Additionally, in some embodiments, the method 600 includes sending, by the server system 102 to the first client device 150, code that is executable by the first client device 150 to generate additional encrypted input data for the first machine learning model 140, where the first machine learning model is further operable to generate the model output data based on this additional encrypted input data.

Further, in some embodiments, the method 600 includes sending, by the server system 102, an authorization rule 222 to the first client device 150, where the first authorization rule 222 is usable to determine, at the first client device, whether to authorize the first operation based on the model output data generated using the first machine learning model 140. In some such embodiments, the determination of whether to authorize the requested operation 162 may be performed on the client device 150 using the authorization rule 222. In other embodiments, the method 600 includes the server system 102 receiving, from the first client device 150, the model output data for the first operation 162, where the model output data is generated, at the first client device 150, using the first machine learning model 140, and determining, by the server system 102, whether to authorize the first operation 162 based on the model output data. In some such embodiments, determining whether to authorize the first operation 162 includes, based on the model output data, the server system 102 executing a second machine learning model to generate second model output data indicative of the level of risk associated with performing the first operation 162 and, the server system 102 determining whether to authorize the first operation 162 based on the second model output data.

Example Computer System

Figure 7:
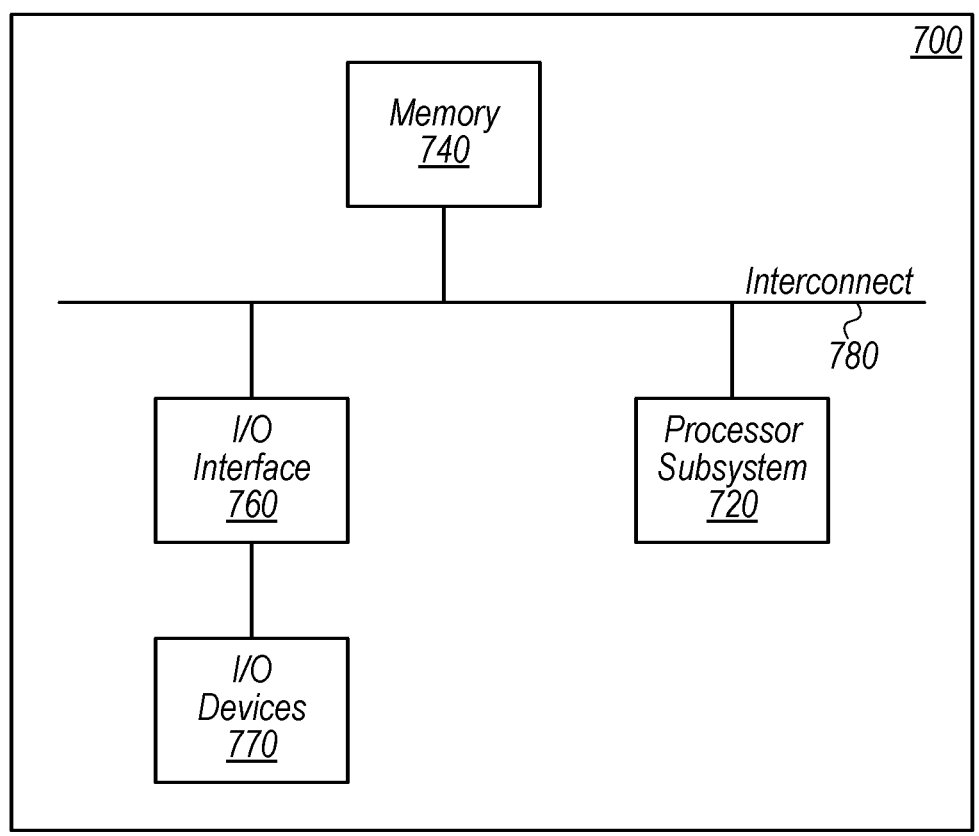
FIG. 7 is a block diagram illustrating an example computer system, according to some embodiments.

Referring now to FIG. 7, a block diagram of an example computer system 700 is depicted, which may implement one or more computer systems, such as client device 150 or one or more computer system within server system 102 of FIG. 1, according to various embodiments. Computer system 700 includes a processor subsystem 720 that is coupled to a system memory 740 and I/O interfaces(s) 760 via an interconnect 780 (e.g., a system bus). I/O interface(s) 760 is coupled to one or more I/O devices 770. Computer system 700 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 700 is shown in FIG. 7 for convenience, computer system 700 may also be implemented as two or more computer systems operating together.

Processor subsystem 720 may include one or more processors or processing units. In various embodiments of computer system 700, multiple instances of processor subsystem 720 may be coupled to interconnect 780. In various embodiments, processor subsystem 720 (or each processor unit within 720) may contain a cache or other form of on-board memory.

System memory 740 is usable to store program instructions executable by processor subsystem 720 to cause system 700 perform various operations described herein. System memory 740 may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 700 is not limited to primary storage such as system memory 740. Rather, computer system 700 may also include other forms of storage such as cache memory in processor subsystem 720 and secondary storage on I/O devices 770 (e.g., a hard drive, storage array, etc.). In some embodiments, these other forms of storage may also store program instructions executable by processor subsystem 720.

I/O interfaces 760 may be any of various types of interfaces configured to couple to and communicate with other devices, according to various embodiments. In one embodiment, I/O interface 760 is a bridge chip (e.g., Southbridge) from a front-side to one or more back-side buses. I/O interfaces 760 may be coupled to one or more I/O devices 770 via one or more corresponding buses or other interfaces. Examples of I/O devices 770 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 770 includes a network interface device (e.g., configured to communicate over WiFi, Bluetooth, Ethernet, etc.), and computer system 700 is coupled to a network via the network interface device.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments described herein are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: Claim 3 (could depend from any of claims 1-2); claim 4 (any preceding claim); claim 5 (claim 4), etc. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—"[entity] configured to [perform one or more tasks]"—is used herein to refer to structure (i.e., something physical). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for [performing a function]" construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

In this disclosure, various "modules" operable to perform designated functions are shown in the figures and described in detail (e.g., model selection module 122, input data retrieval module 124, input data encryption module 126, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

What is claimed is:

1. A method, comprising:
receiving, by a server system from a client device, a request to perform a first operation via a service provided via the server system;
determining, by the server system, that the first operation is associated with at least one of a plurality of machine learning models that are executable at the client device to determine whether to authorize the first operation;
selecting, by the server system, a first one of the plurality of machine learning models to send to the client device, wherein the first machine learning model is executable, by the client device, to generate model output data for the first operation based on one or more encrypted input data values that are encrypted with a cryptographic key inaccessible to the client device, wherein the model output data corresponds to a level of risk associated with performing the first operation;
sending, by the server system, machine learning model evaluation data to the client device, wherein the machine learning model evaluation data includes:
the first machine learning model; and
the one or more encrypted input data values; and
receiving, by the server system from the client device, a response message that indicates whether the first operation is authorized based on the model output data.

2. The method of claim 1, further comprising:
prior to receiving the request, training the first machine learning model using a training dataset of training samples that have encrypted data values.

3. The method of claim 2, wherein a particular one of the training samples in the training dataset includes:
a first set of encrypted data values that have been encrypted using a first encryption algorithm; and
a second set of encrypted data values that have been encrypted using a second encryption algorithm.

4. The method of claim 1, wherein the machine learning model evaluation data further includes code executable, by the client device, to generate additional encrypted input data for the first machine learning model; and
wherein the additional encrypted input data is based on one or more values provided, by a user of the client device, into a webpage provided by the server system.

5. The method of claim 4, wherein the one or more encrypted input data values have been encrypted, by the server system, using a first encryption algorithm; and
wherein the code is executable to encrypt the one or more values, provided by the user, using a second encryption algorithm to generate the additional encrypted input data.

6. The method of claim 1, wherein the selecting the first machine learning model is based on an operation type of the first operation.

7. The method of claim 1, wherein the selecting the first machine learning model is based on a device type of the client device.

8. The method of claim 7, wherein the selecting includes:
determining that the client device is a mobile computing device; and
in response to the determining, selecting the first machine learning model, from a set of machine learning models associated with an operation type of the first operation, to send to the client device, wherein the first machine learning model has lower computational requirements than at least one of the set of machine learning models.

9. The method of claim 1, further comprising:
sending, by the server system, an authorization rule to the client device, wherein the authorization rule is usable to determine, at the client device, whether to authorize the first operation based on the model output data generated using the first machine learning model.

10. A non-transitory, computer-readable medium having instructions stored thereon that are executable by a server system to perform operations comprising:
- receiving, from a client device, a request to perform a first operation via a service provided via the server system;
- selecting, from a plurality of machine learning models, a first machine learning model to send to the client device to determine whether to authorize the first operation, wherein the first machine learning model is executable, by the client device, to generate model output data for the first operation based on one or more encrypted input data values that are encrypted with a cryptographic key inaccessible to the client device, wherein the model output data corresponds to a level of risk associated with performing the first operation;
- sending machine learning model evaluation data to the client device, wherein the machine learning model evaluation data includes:
    - the first machine learning model; and
    - the one or more encrypted input data values;
    - receiving a response message that includes the model output data, for the first operation, generated at the client device using the first machine learning model; and
- determining whether to authorize the first operation based on the model output data.

11. The non-transitory, computer-readable medium of claim 10, wherein, prior to receiving the request, the first machine learning model has been trained using a training dataset of training samples that have encrypted data values.

12. The non-transitory, computer-readable medium of claim 11, wherein a particular one of the training samples in the training dataset includes:
- a first set of encrypted data values that have been encrypted using a first cryptographic key; and
- a second set of encrypted data values that have been encrypted using a second, different cryptographic key.

13. The non-transitory, computer-readable medium of claim 12, wherein the one or more encrypted input data values have been encrypted, by the server system, using the first cryptographic key; and wherein the machine learning model evaluation data further includes code executable, by the client device, to generate additional encrypted input data, for the first machine learning model, using the second, different cryptographic key.

14. The non-transitory, computer-readable medium of claim 10, wherein the selecting the first machine learning model includes:
- determining that the client device is one of a laptop computer or a desktop computer; and
- in response to the determining, selecting the first machine learning model, from a set of machine learning models associated with an operation type of the first operation, to send to the client device, wherein the first machine learning model has higher computational requirements than at least one of the set of machine learning models.

15. A method, comprising:
- accessing, by a server system, training data that includes training samples corresponding to prior operations performed, via a service provided via the server system, for a plurality of users;
- generating, by the server system, encrypted training data that includes encrypted training samples corresponding to the training samples, wherein a particular one of the encrypted training samples includes a plurality of encrypted data values corresponding to a particular one of the prior operations;
- training, by the server system, a first machine learning model based on the encrypted training data such that, after training, the first machine learning model is operable to generate, based on encrypted input data, model output data corresponding to a level of risk associated with a particular type of operation;
- converting, by the server system, the first machine learning model into a format that is executable by client devices to generate the model output data;
- receiving, by the server system from a first client device, a request to perform a first operation, of the particular type of operation, via the service provided via the server system; and
- sending, by the server system, the first machine learning model to the first client device.

16. The method of claim 15, wherein the request to perform the first operation is associated with a first user account with the server system, wherein the method further comprises:
- retrieving, by the server system, input data values for the first machine learning model, wherein the input data values are associated with the first user account;
- encrypting, by the server system, the input data values using a cryptographic key inaccessible to the first client device to generate a set of encrypted input data values; and
- sending, by the server system, the set of encrypted input data values to the first client device, wherein the first machine learning model is operable to generate the model output data based on the set of encrypted input data values.

17. The method of claim 16, further comprising:
- sending, by the server system, an authorization rule to the first client device, wherein the authorization rule is usable to determine, at the first client device, whether to authorize the first operation based on the model output data generated using the first machine learning model.

18. The method of claim 16, further comprising:
- receiving, by the server system from the first client device, the model output data for the first operation, wherein the model output data is generated, at the first client device, using the first machine learning model; and
- determining, by the server system, whether to authorize the first operation based on the model output data.

19. The method of claim 18, wherein the determining whether to authorize the first operation includes:
- based on the model output data, executing, by the server system, a second machine learning model to generate second model output data indicative of the level of risk associated with performing the first operation; and
- determining whether to authorize the first operation based on the second model output data.

20. The method of claim 15, further comprising:
- sending, by the server system to the first client device, code that is executable by the first client device to generate additional encrypted input data for the first machine learning model, wherein the first machine learning model is further operable to generate the model output data based on the additional encrypted input data.

* * * * *